United States Patent
Mitamura et al.

(10) Patent No.: US 9,249,047 B2
(45) Date of Patent: Feb. 2, 2016

(54) ULTRAVIOLET AND INFRARED ABSORPTIVE GLASS

(71) Applicant: Central Glass Company, Limited, Ube-shi, Yamaguchi (JP)

(72) Inventors: Naoki Mitamura, Matsusaka (JP); Tatsuya Tsuzuki, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 306 days.

(21) Appl. No.: 13/804,492

(22) Filed: Mar. 14, 2013

(65) Prior Publication Data

US 2013/0264528 A1  Oct. 10, 2013

(30) Foreign Application Priority Data

Mar. 30, 2012  (JP) .................. 2012-078502

(51) Int. Cl.
 *C03C 3/095* (2006.01)
 *C03C 3/087* (2006.01)
 *C03C 4/02* (2006.01)
 *C03C 4/08* (2006.01)

(52) U.S. Cl.
 CPC .............. *C03C 4/085* (2013.01); *C03C 3/095* (2013.01); *C03C 4/02* (2013.01); *C03C 4/082* (2013.01)

(58) Field of Classification Search
 CPC ........ C03C 3/087; C03C 3/095; C03C 4/085; C03C 4/082; C03C 4/02
 See application file for complete search history.

(56) References Cited

U.S. PATENT DOCUMENTS

| | | | |
|---|---|---|---|
| 5,214,008 A | 5/1993 | Beckwith et al. | |
| 5,362,689 A * | 11/1994 | Morimoto et al. | 501/70 |
| 6,017,836 A | 1/2000 | Nagashima et al. | |
| 6,017,837 A | 1/2000 | Nagashima et al. | |
| 6,455,452 B1 * | 9/2002 | Krumwiede | 501/71 |
| 6,544,915 B2 * | 4/2003 | Nagashima | 501/64 |
| 2003/0050174 A1 | 3/2003 | Nagashima | |
| 2003/0083188 A1 * | 5/2003 | Seto et al. | 501/71 |
| 2003/0100432 A1 * | 5/2003 | Seto et al. | 501/71 |
| 2003/0216242 A1 * | 11/2003 | Arbab et al. | 501/71 |
| 2004/0067835 A1 * | 4/2004 | Seto et al. | 501/64 |
| 2004/0077479 A1 * | 4/2004 | Coster et al. | 501/71 |
| 2005/0032624 A1 * | 2/2005 | Teyssedre et al. | 501/71 |
| 2005/0170944 A1 * | 8/2005 | Arbab et al. | 501/64 |
| 2007/0054796 A1 * | 3/2007 | Shelestak et al. | 501/71 |
| 2008/0149902 A1 * | 6/2008 | Teyssedre | 252/587 |
| 2009/0025426 A1 * | 1/2009 | Landa et al. | 65/30.13 |
| 2013/0264528 A1 | 10/2013 | Mitamura et al. | |

FOREIGN PATENT DOCUMENTS

| | | |
|---|---|---|
| CN | 1052647 A | 7/1991 |
| CN | 1336904 A | 2/2002 |
| CN | 101544477 A | 9/2009 |
| JP | 7121181 A | 12/1995 |
| JP | 9-48635 A | 2/1997 |
| JP | 3086165 B2 | 9/2000 |
| JP | 3899531 B2 | 3/2007 |
| JP | 3900550 B2 | 4/2007 |

* cited by examiner

*Primary Examiner* — Anthony J Green
*Assistant Examiner* — Elizabeth A Bolden
(74) *Attorney, Agent, or Firm* — Crowell & Moring LLP

(57) ABSTRACT

Disclosed is an ultraviolet and infrared absorptive glass characterized by that its coloring component contains, based on mass of the ultraviolet and infrared absorptive glass, 0.05-0.9 mass % of $CeO_2$, 0.50-1.20 mass % of of total iron oxide in terms of $Fe_2O_3$, 0.08-0.30 mass % of FeO, 0.1-1.5 mass % of $TiO_2$, 10-25 mass ppm of CoO, and 0.1-50 mass ppm of $Cr_2O_3$, that mass ratio ($Fe^{2+}/Fe^{3+}$) of divalent iron to trivalent iron is 0.20-0.45, and that dominant wavelength measured by using illuminant $D_{65}$ of JIS Z 8701 is 510-560 nm. This glass has satisfactory optical characteristics, even though the content of $CeO_2$ has been reduced.

14 Claims, No Drawings

ULTRAVIOLET AND INFRARED ABSORPTIVE GLASS

TECHNICAL FIELD

The present invention relates to an ultraviolet and infrared absorptive glass, which absorbs ultraviolet rays and infrared rays. In particular, it relates to an ultraviolet and infrared absorptive glass, which is usable as a window glass for architectural, automotive, watercraft and aircraft uses.

BACKGROUND OF THE INVENTION

In recent years, from the viewpoints of human and material adverse effects, such as decoloration and deterioration of articles or skin sunburn by exposure to the sunlight, and from the viewpoint of energy saving, such as air-conditioning load reduction, in not only architectural window glass, but also automotive, watercraft and aircraft ones, etc., there has been a drastically increasing need for a plate glass article with multiple functions, such as having ultraviolet reflection and absorption, etc. in addition to heat ray reflection and absorption.

Since the above-mentioned plate glass article with multiple functions is used as a window glass, normally there is a tendency that one having lighting (i.e., visible light transmission) is preferred. Thus, it is requested to have ultraviolet and infrared shieldings and the visible light transmission. Above all, when it is used as an automotive front windshield, it is requested to have ultraviolet and infrared shielding properties and a visible light transmittance of at least 70%.

In general, to produce such glass, it is made to contain $Fe_2O_3$ (total iron oxide) as a coloring agent in the glass composition and is provided with ultraviolet absorptive property by $Fe_2O_3$ (trivalent iron), infrared absorptive property by FeO (divalent iron), and ultraviolet absorptive property by $CeO_2$ and $TiO_2$. Normally, such glass becomes a colored glass due to containing coloring components. In recent years, there has been a high demand for a glass showing a green color. Therefore, the color tone of the glass is controlled by adjusting the content of each component and proportions of the corresponding components. Furthermore, the glass is prevented from lowering of the visible light transmittance by a degree more than need.

Japanese Patent No. 3086165 B2 (Patent Publication 1) discloses an ultraviolet and infrared absorptive, greenish glass containing as coloring raw materials 0.40-0.90 mass % $Fe_2O_3$, 1.0-2.5 mass % $CeO_2$, 0.1-1.0 mass % $TiO_2$, 0.0010-0.0400 mass % MnO, 0.0001-0.0009 mass % $CeO_2$, 0.0001-0.0010 mass % $Cr_2O_3$, and 0-1 mass % $SnO_2$, and having optical properties (at a thickness of 5 mm) that the visible light transmittance by illuminant A is at least 65%, the solar transmittance is 30-40%, and the ultraviolet transmittance is 10% or lower.

Japanese Patent No. 3900550 B2 (Patent Publication 2) discloses an ultraviolet absorptive green glass consisting essentially of a soda-lime-silica glass containing 0.45-0.491 mass % total iron in terms of $Fe_2O_3$ (the amount of divalent iron in terms of $Fe_2O_3$ is 30.5-32.0 mass % relative to 100 mass % of total iron in terms of $Fe_2O_3$), 1.09-1.2 mass % $CeO_2$, 0.3-0.39 mass % $TiO_2$, and 0-0.0003 mass % CoO. This green glass has optical properties (at a thickness of 6.0 mm) that the visible light transmittance by illuminant A is at least 70%, and the ultraviolet transmittance is 6.94% or lower.

Japanese Patent No. 3899531 B2 (Patent Publication 3), corresponding to U.S. Pat. No. 6,017,837 A, discloses an ultraviolet and infrared absorptive glass, which contains as coloring raw materials 0.60-0.85 mass % $Fe_2O_3$ (total iron oxide), 1.4-1.7 mass % $CeO_2$, and 0-0.15 mass % $TiO_2$, and is characterized by satisfying the following equation, $$(0.2\times(CeO_2)-0.04)\leq(FeO/T\text{-}Fe_2O_3)\leq(0.2\times(CeO_2)+0.08)$$

wherein ($CeO_2$) represents the mass % of $CeO_2$, (FeO/T-$Fe_2O_3$) represents the mass ratio of FeO in terms of $Fe_2O_3$ to the total iron oxide (T-$Fe_2O_3$) in terms of $Fe_2O_3$. Furthermore, this glass has optical properties (at a thickness of 4 mm) that the visible light transmittance by illuminant A is at least 70%, the solar transmittance is less than 48%, and the ultraviolet transmittance is less than 24%.

Japanese Patent Application Examined Publication 7-121815 B2 (Patent Publication 4), corresponding to U.S. Pat. No. 5,214,008 A, discloses an infrared and ultraviolet absorptive, green glass, which contains as coloring raw materials 0.7-0.95 mass % $Fe_2O_3$ (total iron oxide) and 0.19-0.24 mass % FeO and is substantially free from $TiO_2$ and $CeO_2$. This glass has optical properties at a thickness of from 3.7 mm to 4.8 mm that the visible light transmittance exceeds 70%, the total solar energy transmittance is less than 44.5%, and the ultraviolet transmittance is less than 38%.

Japanese Patent Application Publication 9-48635 A (Patent Publication 5), corresponding to U.S. Pat. No. 6,017,836 A, discloses an ultraviolet and infrared absorptive glass containing as coloring raw materials 0.5-1.0 mass % total iron in terms of $Fe_2O_3$, in which the FeO/total iron oxide ratio is 0.20 to 0.40, 0.2-2.0 mass % $CeO_2$, and 0-1.0 mass % $TiO_2$. Due to containing 0.2-5.0 mass % $B_2O_3$, this glass is classified as an alkaliborosilicate glass. Furthermore, this glass has optical properties at a thickness of 4 mm that the visible light transmittance is at least 70%, and the solar transmittance is less than 48%, and the ultraviolet transmittance is less than 30%.

SUMMARY OF THE INVENTION $CeO_2$ as one of the above-mentioned coloring components is a very useful component, since it is capable of improving the ultraviolet absorptive property without lowering the visible light transmittance. In recent years, however, there has been a concern about its supply shortage caused by a so-called rare-earth problem. Thus, its price has already been soaring, causing a demand for reducing the content of $CeO_2$ as much as possible.

The ultraviolet and infrared absorptive glasses disclosed in Patent Publications 1-3 are satisfactory in terms of the ultraviolet absorptive property and the visible light transmittance to be used as a window glass. These glasses are, however, made to have both of the ultraviolet absorptive property and the visible light transmittance by containing at least 1.0 mass % of $CeO_2$. In contrast, Patent Publications 4 and 5 disclose glasses that are free from $CeO_2$ or contain less than 1.0 mass % of $CeO_2$. It is, however, difficult to say that these glasses are sufficient in ultraviolet absorptive property. Furthermore, the glass disclosed in Patent Publication 5 is an alkaliborosilicate glass, causing problems that the glass composition fluctuates by evaporation when melting the glass and that corrosion of bricks of a melting furnace becomes vigorous.

As mentioned above, there is a recent trend to produce an ultraviolet and infrared absorptive glass to have a greenish color by setting the content of each component. In the case of lowering the content of $CeO_2$, it is necessary to increase the contents of ultraviolet absorptive components except $CeO_2$. The resulting glass may, however, not show a greenish color, since these ultraviolet absorptive components are each coloring components. Thus, it has been difficult to make a colored glass with a reduced content of $CeO_2$ have both the desired color tone and the desired absorptive property in the target wavelength ranges.

Therefore, it is an object of the present invention to provide an ultraviolet and infrared absorptive glass usable as various window glasses, while reducing the content of $CeO_2$ necessary for the ultraviolet absorptive property.

The present invention was made in view of the above-mentioned task to obtain an ultraviolet and infrared absorptive glass, in which the ultraviolet transmittance measured in accordance with International Standard ISO 9050:1990 becomes less than 20%, which has a visible light transmittance suitable as that of a window glass, and in which the dominant wavelength measured by using illuminant $D_{65}$ of Japanese Industrial Standards (JIS) Z 8701 is in a range of 510 to 560 nm, by suitably adjusting the contents of $Fe_2O_3$, FeO, $TiO_2$ and CoO as coloring components, even if the content of $CeO_2$ as an ultraviolet absorptive component is reduced to 0.9 mass % or less.

That is, according to the present invention, there is provided an ultraviolet and infrared absorptive glass, which is a soda-lime-silica glass containing a coloring component. The ultraviolet and infrared absorptive glass is characterized by that the coloring component contains, based on mass of the ultraviolet and infrared absorptive glass, 0.05-0.9 mass % of $CeO_2$, 0.50-1.20 mass % of $Fe_2O_3$ (total iron oxide), 0.08-0.30 mass % of FeO (divalent iron), 0.1-1.5 mass % of $TiO_2$, 10-25 mass ppm of CoO, and 0.1-50 mass ppm of $Cr_2O_3$, that the mass ratio ($Fe^{2+}/Fe^{3+}$) of the divalent iron to the trivalent iron is 0.20-0.45, and that the dominant wavelength measured by using illuminant $D_{65}$ of JIS Z 8701 is 510-560 nm.

The amount of $Fe_2O_3$ (total iron oxide) refers to that of the total iron oxide contained in the glass in terms of $Fe_2O_3$.

In the specification, the soda-lime-silica glass is a glass containing $Na_2O$, CaO and $SiO_2$ as components of the basic composition to be used as a window glass for general purposes due to its good weather resistance. In the present invention, the total of the three components $Na_2O$, CaO and $SiO_2$ may be, for example, at least 80 mass %.

In the present invention, the content of the coloring component is adjusted as above so that the dominant wavelength measured in accordance with JIS Z 8701 is in a range of 510-560 nm. When the dominant wavelength is in this range, the ultraviolet and infrared absorptive glass shows a green color.

Advantageous Effect of the Invention

It has become possible by the present invention to obtain an ultraviolet and infrared absorptive glass with the reduced content of $CeO_2$. This glass shows a green color and can suitably be used as a window glass for architectural, automotive, watercraft and aircraft uses.

DETAILED DESCRIPTION

In the present invention, the coloring component of the ultraviolet and infrared absorptive glass contains, based on mass (100 mass %) of this glass, 0.05-0.9 mass % of $CeO_2$, 0.50-1.20 mass % of $Fe_2O_3$ (total iron oxide), 0.08-0.30 mass % of FeO (divalent iron), 0.1-1.5 mass % of $TiO_2$, 10-25 mass ppm of CoO, and 0.1-50 mass ppm of $Cr_2O_3$, that the mass ratio ($Fe^{2+}/Fe^{3+}$) of the divalent iron to the trivalent iron is 0.20-0.45. Of these components, $CeO_2$, $Fe_2O_3$ and $TiO_2$ are used for providing the ultraviolet absorptive property, FeO is for the infrared absorptive property, and CoO and $Cr_2O_3$ are for the color tone.

$CeO_2$ is a component capable of improving the ultraviolet absorptive property without lowering the visible light transmittance. It has become possible by the present invention to obtain a desired ultraviolet and infrared absorptive glass, even if the content of $CeO_2$ is lowered to 0.05-0.9 mass %. Preferably, it may be 0.1-0.9 mass %, in view of the ultraviolet absorptive property. More preferably, its upper limit may be 0.8 mass % to obtain a good ultraviolet absorptive property.

In the present invention, the amount of $Fe_2O_3$ (total iron oxide) refers to that of the total iron oxide contained in the glass calculated in terms of $Fe_2O_3$. In other words, it is the total of the content of iron(III) oxide $Fe_2O_3$ and the content of iron(II) oxide FeO converted to that of $Fe_2O_3$. $Fe_2O_3$ has the ultraviolet absorptive property, and FeO has the infrared absorptive property. In the present invention, the mass ratio ($Fe^{2+}/Fe^{3+}$) of divalent iron to trivalent iron is determined in order to have both of these properties with a good balance.

The content of $Fe_2O_3$ (total iron oxide) in the glass is 0.50-1.20 mass %, preferably 0.50-1.10 mass %, more preferably 0.55-1.10 mass %. If it is less than 0.50 mass %, the ultraviolet and infrared absorptive properties become insufficient. If it exceeds 1.20 mass %, there occurs an inconvenience such as necessity of the time for changing the glass composition in the case of a continuous production in a glass melting furnace, for example, for producing a large-size glass plate for architectural and automotive uses.

The content of FeO (divalent iron) in the glass is 0.08-0.30 mass %, preferably 0.08-0.29 mass %, more preferably 0.09-0.27 mass %. If it is less than 0.08 mass %, its infrared absorptive property becomes insufficient. If it exceeds 0.30 mass %, transparency may be impaired by lowering of the visible light transmittance. Furthermore, due to the excessive infrared absorptive property, the temperature of ceiling of the melting furnace may exceed the heat-resistant temperature by radiant heat when melting the glass. Still furthermore, there occurs an inconvenience such as necessity of the time for changing the glass composition in the case of a continuous production in a glass melting furnace.

The mass ratio ($Fe^{2+}/Fe^{3+}$) of the divalent iron to the trivalent iron is set at 0.20-0.45, preferably 0.22-0.43. If it is less than 0.20 or greater than 0.45, a balance between the ultraviolet absorptive property and the infrared absorptive property becomes inferior. Furthermore, the color tone change tends to occur in the plate-forming step in the float process or the like and in the heat treatment step of a tempered glass or curved glass, etc. The adjustment of the mass ratio of $Fe^{2+}/Fe^{3+}$ is conducted by regulating the amounts of the raw materials, such as carbon and mirabilite, and the furnace operation, such as combustion condition. In addition, in order to stabilize the color tone, it is optional to introduce oxygen gas, a mixed gas containing oxygen gas, a combustion exhaust gas with the increased concentration of air or oxygen gas, or a combined gas of these.

$TiO_2$ not only improves the ultraviolet absorptive property, but also absorbs the visible region. Thus, its content in the glass is 0.1-1.5 mass %, preferably 0.2-1.5 mass %, more preferably 0.3-1.5 mass %. If it exceeds 1.5 mass %, its absorption of the visible region becomes large. Thus, it becomes necessary to lower the amount of $Fe_2O_3$ (total iron) in the glass. This may cause a negative effect in total on the ultraviolet absorptive property and the infrared absorptive property.

CoO is contained in the glass in order that the dominant wavelength of the ultraviolet and infrared absorptive glass may be in a range of 510-560 nm. Its content in the glass is 10-25 ppm, preferably 11-23 ppm, more preferably 11-20 ppm. If it is less than 10 ppm, a conspicuous effect is not found. If it exceeds 25 ppm, it may cause adverse effects, such as the increase of solar transmittance, a striking lowering of the visible light transmittance by coloration resulting from CoO, etc. Generally speaking, in order to achieve a high ultraviolet absorptive property with a low content of $CeO_2$ as in the glass of the present invention, it is necessary to take a measure, such as increasing the amount of $Fe_2O_3$ (trivalent iron), that is, decreasing the mass ratio ($Fe^{2+}/Fe^{3+}$) of divalent iron to trivalent iron, or increasing the content of $TiO_2$. With this, the dominant wavelength of the glass may deviate from a desired range (e.g., 510-560 nm). In the present invention, however, the dominant wavelength is made to be in a range of 510-560 nm.

Since $Cr^{6+}$ is a component for improving the ultraviolet absorptive property, $Cr_2O_3$ is contained in the glass by 0.1-50 mass ppm, preferably 0.1-30 mass ppm, more preferably 0.1-25 mass ppm. If it is greater than 50 mass ppm, the visible light transmittance is lowered by the effect of $Cr^{3+}$.

ZnO is a substance for suppressing the generation of nickel sulfide and may be contained by an amount of up to 0.5 mass %, preferably up to 0.3 mass %. Nickel sulfide is hardly found by visual inspection and does no harm to the glass under normal conditions. However, due to its high thermal expansion coefficient, for example, when conducting a thermal toughening, its volume expansion may destroy the stress balance of the glass. This may cause the glass to break. Since ZnO is a high-price material, its use exceeding 0.5 mass % increases the glass production cost.

At least one of MnO, $V_2O_5$, $MoO_3$, CuO, $SnO_2$, and $SO_3$ may be contained in the glass composition of the present invention for the purpose of adjusting the color tone, the degree of reduction, etc., by up to 1.0 mass %, more preferably up to 0.5 mass %, to the extent that the object of the present invention is not impaired.

In the present invention, the dominant wavelength (when using illuminant $D_{65}$) is set at 510-560 nm. With this, the color of the glass becomes preferable in vision and does not give a sense of fatigue to human eyes. Preferably, it may be set at 510-555 nm.

In the present invention, excitation purity (when using illuminant $D_{65}$) is less than 6.5%. With this, the color tone of the glass is not too dark. For example, even under a condition of sunset, cloudy weather or rainy weather, transparency is not impaired. Preferably, it may be less than 6.0%.

In the present invention, the ultraviolet transmittance of the glass is adjusted to less than 20%. With this, it is possible to suppress as much as possible human and material adverse effects, such as decoloration and deterioration of articles or skin sunburn. Preferably, it is adjusted to less than 18%. More preferably, it is to less than 15%.

In the present invention, the solar transmittance measured in accordance with JIS R3106 is preferably less than 55%, more preferably less than 53%, still more preferably less than 50%. If it is less than 55%, it is possible to suppress as much as possible heat rays from solar radiation, etc. For example, the cooling load in summer time can effectively be reduced.

In the present invention, when the thickness of the ultraviolet and infrared absorptive glass is up to 5 mm, it is preferable that the visible light transmittance measured in accordance with JIS R3211 is at least 70%. In general, as a glass becomes thicker in thickness, the visible light transmittance becomes lower. Depending on the use of glass, the thickness of the glass plate used and the visible light transmittance requested are different. Furthermore, the visible light transmittance is required by regulation to be at least 70%, irrespective of the thickness, for example, in the case of using a glass as an automotive front windshield. In the case of automotive front windshields, a glass having a thickness of 2-4 mm is widely used from the viewpoints of safety, weight, etc. Such glass is also preferable as a window glass for architectural use, etc., since it can provide a comfortable lighting (i.e., visible light transmission).

As a first preferred embodiment of the present invention, it is possible to mention an ultraviolet and infrared absorptive glass having a thickness of up to 4 mm, preferably 2-4 mm to be operable as a window glass. This glass is preferable as an automotive window glass and makes it possible to have an ultraviolet transmittance of up to 13% and a solar transmittance of less than 55%, while having a visible light transmittance of at least 70%. In the first preferred embodiment, it becomes possible to have the above-mentioned optical characteristics by containing 0.70-1.20 mass % of $Fe_2O_3$ (total iron oxide), 0.13-0.30 mass % of FeO (divalent iron), and 10-23 mass ppm of CoO among the coloring components.

As a second preferred embodiment of the present invention, it is possible to mention an ultraviolet and infrared absorptive glass having a thickness exceeding 4 mm. This glass can preferably be used as an architectural window glass. In the second preferred embodiment, it is preferable that the glass contains 0.50-0.80 mass % of $Fe_2O_3$ (total iron oxide) and 0.08-0.20 mass % of FeO (divalent iron) among the coloring components. With this, it becomes possible to suppress lowering of the visible light transmittance, while maintaining an ultraviolet transmittance of less than 20% and a solar transmittance of less than 55%. It suffices to have a thickness to be operable as a window glass. Its upper limit may be, for example, 25 mm.

In the present invention, it is preferable that the above-mentioned coloring components are contained in a soda-lime-silica glass containing 65-80 mass % $SiO_2$, 0-5 mass % $Al_2O_3$, 0-10 mass % MgO, 5-15 mass % CaO, 10-18 mass % $Na_2O$, and 0-5 mass % $K_2O$, wherein the total of MgO and CaO is 5-15 mass %, and the total of $Na_2O$ and $K_2O$ is 10-20 mass %. This soda-lime-silica glass is a glass on which a tempering treatment can easily be conducted. Therefore, it is useful in the case of producing a tempered glass.

The components of the above-mentioned soda-lime-silica glass are described in detail, as follows. $SiO_2$ is a main component for constructing the network of the glass and is contained preferably by 65-80 mass %. If it is less than 65 mass %, the glass tends to have weathering (stain) or the like on the surface. This tends to cause a practical problem, such as lowering of weather resistance, etc. If it exceeds 80 mass %, the tempering easiness becomes comparable to that of ordinary glasses. Furthermore, the temperature upon melting the glass may become high.

$Al_2O_3$ is an optional component. Since it is a component to improve weather resistance of the glass, its content is preferably up to 5 mass %. Exceeding 5 mass % tends to cause devitrification.

MgO and CaO are used for lowering the melting temperature. It is preferable to contain these components as those for making the glass easily tempered. Although MgO is an optional component to be contained by 0-10 mass %, CaO is an essential component of the soda-lime-silica glass to be contained by 5-15 mass %. If it is less than 5 mass %, it tends to become insufficient as flux. With this, the melting temperature becomes high, and lowering of flow temperature becomes insufficient. Exceeding 15 mass % may tend to cause devitrification.

The total of MgO and CaO is 5-15 mass %. Exceeding 15 mass % may tend to cause devitrification. Therefore, it is preferable to adjust the total of these components to up to 15 mass %. It is preferable to contain both of these components.

With this, it is possible to adjust Young's modulus and expansion of the glass, while lowering the melting temperature of the glass. Therefore, it becomes possible to easily conduct air-quench tempering in particular. More preferably, the content may be 10-15 mass %.

$Na_2O$ is an essential component of the soda-lime-silica glass to be contained by 10-18 mass % and serves to make the glass easily tempered. If the content is less than 10 mass %, it is difficult to have an effect of making the glass easily tempered. Furthermore, devitrification tends to occur easily. If it exceeds 18 mass %, weather resistance lowers, thereby causing weathering (stain) on the surface.

By containing $K_2O$ together with $Na_2O$, it becomes easy to improve the stress value of compressive stress generated by the tempering treatment. Thus, $K_2O$ may be contained by 0-5 mass %. If it exceeds 5 mass %, weather resistance of the glass may be lowered. The total of $Na_2O$ and $K_2O$ is preferably 10-20 mass %. If it exceeds 20 mass %, weather resistance of the glass may be lowered.

Besides the above-mentioned components, the soda-lime-silica glass may contain less than 1 mass % of $B_2O_3$, $ZrO_2$, SrO, BaO, $Sb_2O_3$, etc.

In the case of using a glass that can easily be tempered as the soda-lime-silica glass, it is preferably an automotive glass produced through a tempering treatment step in particular. The tempering treatment is conducted to improve strength of the glass by forming a compressive stress layer on the glass surface layer. It is preferable to conduct particularly an air-quench tempering treatment as the tempering treatment.

The air-quench tempering treatment is conducted by heating the glass to around the glass transition temperature, while conveying the glass plate on the conveyor roll, to increase the temperature of the glass plate until a desired temperature, and then allowing the wind to blow against the glass plate from cooling nozzles. Upon this, it is preferable that the wind to blow has a wind pressure of 5-30 kPa, more preferably 7-20 kPa. In the present invention, the air quenching is started by allowing the wind to blow against the glass plate, when the glass plate has a temperature of preferably 550-670° C., more preferably 580-670° C.

EXAMPLES 1-15 AND COMPARATIVE EXAMPLES 1-2

In each of these examples and comparative examples, a glass composition as shown in Table 1 was prepared by mixing together predetermined amounts of silicon dioxide, aluminum oxide, sodium carbonate, calcium carbonate and magnesium oxide as glass raw materials, and iron(III) oxide, titanium oxide, cerium oxide, cobalt oxide and chromium oxide as coloring components, and adding sodium sulfate and a carbonaceous reducing agent (to be specific, carbon powder) so that the contents of the coloring components are in predetermined ranges. This glass composition was melted by heating to 1500° C. in an electric furnace. The melting was conducted at 1500° C. for 5 hours, following by lowering the temperature until 1400° C. by spending one hour. This condition was maintained for 30 minutes. Then, the glass melt was poured into a graphite mold to have a plate form. It was sufficiently annealed until room temperature to obtain a glass plate having a thickness of about 10 mm. Then, this glass plate was subjected to an optical polishing until obtaining a thickness shown in Table 1 to prepare a test sample (size: 50 mm×50 mm) for glass component composition analyses and various optical property measurements.

The glass component composition analyses were conducted with respect to $Fe_2O_3$, $TiO_2$, $CeO_2$, CoO, and $Cr_2O_3$ as the coloring components. The mass ratio ($Fe^{2+}/Fe^{3+}$) of divalent iron to trivalent iron was calculated by determining the amount of FeO from the transmittance at about 1100 nm in infrared region in the spectral transmittance curve and then subtracting the amount of FeO from the amount of total iron ($Fe_2O_3$) to determine the amount of trivalent iron.

Optical characteristics of the glass were evaluated by using an automated spectrophotometer U4000 made by Hitachi Ltd. The ultraviolet transmittance (%) was determined in accordance with International Standard ISO 9050:1990, the solar transmittance (%) was with JIS R3106, the visible light transmittance (%) was with JIS R3211, and the dominant wavelength (nm) and the excitation purity (%) were determined by using illuminant $D_{65}$ of JIS Z8701. The results are shown in Table 2.

TABLE 1

| | | Examples | | | | | | | | | | | | | | | | Comparative Examples | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 1 | 2 |
| $SiO_2$ | mass % | 70.1 | 70.3 | 70.3 | 70.1 | 70.5 | 70.5 | 70.0 | 70.4 | 70.2 | 70.4 | 70.8 | 70.3 | 70.3 | 70.1 | 70.4 | 70.0 | 69.7 |
| $Al_2O_3$ | | 2.0 | 2.0 | 2.0 | 2.0 | 2.0 | 2.0 | 2.0 | 2.0 | 2.0 | 2.0 | 2.0 | 2.0 | 2.0 | 2.4 | 2.0 | 2.0 | 2.0 |
| CaO | | 8.3 | 8.4 | 8.3 | 8.3 | 8.4 | 8.4 | 8.3 | 8.3 | 8.4 | 8.2 | 8.0 | 8.3 | 8.4 | 8.3 | 8.4 | 9.0 | 8.9 |
| MgO | | 3.4 | 3.4 | 3.4 | 3.4 | 3.4 | 3.4 | 3.4 | 3.4 | 3.4 | 3.3 | 3.2 | 3.4 | 3.4 | 3.4 | 3.4 | 3.4 | 3.4 |
| $Na_2O$ | | 12.9 | 12.9 | 12.9 | 12.9 | 12.9 | 12.9 | 13.0 | 12.9 | 13.0 | 12.8 | 12.7 | 12.8 | 12.9 | 12.8 | 13.0 | 12.7 | 12.7 |
| $K_2O$ | | 1.0 | 0.9 | 1.0 | 0.9 | 1.0 | 1.0 | 1.0 | 1.0 | 1.0 | 1.0 | 1.0 | 0.9 | 0.9 | 0.9 | 0.9 | 1.0 | 0.9 |
| $CeO_2$ | | 0.27 | 0.32 | 0.32 | 0.74 | 0.22 | 0.41 | 0.60 | 0.36 | 0.36 | 0.36 | 0.08 | 0.36 | 0.37 | 0.41 | 0.41 | 0.00 | 0.08 |
| $Fe_2O_3$ (total iron) | | 0.86 | 0.96 | 1.14 | 0.76 | 0.86 | 0.86 | 0.80 | 0.95 | 0.85 | 0.84 | 0.83 | 0.75 | 0.57 | 0.57 | 0.62 | 0.85 | 0.84 |
| FeO | | 0.20 | 0.21 | 0.22 | 0.18 | 0.19 | 0.20 | 0.20 | 0.19 | 0.15 | 0.16 | 0.13 | 0.17 | 0.13 | 0.10 | 0.14 | 0.28 | 0.125 |
| $TiO_2$ | | 1.06 | 0.65 | 0.63 | 0.72 | 0.55 | 0.46 | 0.90 | 0.72 | 0.72 | 1.07 | 1.30 | 1.07 | 1.07 | 0.90 | 0.72 | 0.97 | 1.31 |
| CoO | mass ppm | 14 | 15 | 17 | 13 | 15 | 14 | 14 | 15 | 14 | 14 | 25 | 13 | 12 | 12 | 13 | 4 | 3 |
| $Cr_2O_3$ | | 2 | 14 | 12 | 5 | 4 | 14 | 3 | 6 | 4 | 5 | 1.0 | 6 | 5 | 3 | 5 | 2 | 4 |
| $Fe^{2+}/Fe^{3+}$ | | 0.36 | 0.32 | 0.27 | 0.35 | 0.33 | 0.34 | 0.39 | 0.29 | 0.25 | 0.26 | 0.20 | 0.33 | 0.32 | 0.26 | 0.32 | 0.58 | 0.2 |
| Thickness | mm | 2.5 | 2.5 | 2.5 | 3.4 | 3.4 | 3.4 | 3.4 | 3.4 | 3.4 | 3.4 | 3.4 | 4.0 | 5.0 | 5.0 | 5.0 | 3.4 | 3.4 |

TABLE 2

| | | Examples | | | | | | | | | | | | | | | Comparative Examples | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 1 | 2 |
| Visible light transmittance | % | 75.0 | 74.8 | 72.5 | 72.9 | 72.0 | 71.0 | 71.2 | 70.6 | 74.0 | 73.5 | 72.6 | 70.7 | 71.6 | 73.9 | 72.0. | 67.0 | 77.5 |
| Ultraviolet transmittance | | 15.0 | 15.2 | 12.4 | 9.9 | 14.1 | 12.7 | 9.2 | 9.7 | 11.5 | 9.5 | 11.3 | 8.7 | 9.3 | 9.8 | 9.8 | 13.5 | 10.8 |
| Solar transmittance | | 53.4 | 53.0 | 50.1 | 49.7 | 47.8 | 46.1 | 46.7 | 47.0 | 53.0 | 52.8 | 56.6 | 47.0 | 48.6 | 54.4 | 49.3 | 36.9 | 57.3 |
| Dominant wavelength | nm | 550 | 538 | 548 | 541 | 518 | 512 | 546 | 546 | 547 | 556 | 554 | 551 | 545 | 546 | 533 | 540 | 564 |
| Excitation purity | % | 3.8 | 2.7 | 4.0 | 3.3 | 2.2 | 2.4 | 4.2 | 4.2 | 3.7 | 5.5 | 4.5 | 5.2 | 2.8 | 3.6 | 2.8 | 4.9 | 7.7 |
| Thickness | mm | 2.5 | 2.5 | 2.5 | 3.4 | 3.4 | 3.4 | 3.4 | 3.4 | 3.4 | 3.4 | 3.4 | 4.0 | 5.0 | 5.0 | 5.0 | 3.4 | 3.4 |

As are clear from Tables 1 and 2, each glass according to Examples 1-15 was satisfactory in optical characteristics, showing at least 70% in visible light transmittance, less than 20% in ultraviolet transmittance, and 510-560 nm in dominant wavelength. In contrast, each glass according to Comparative Examples 1-2 was not satisfactory in optical characteristics.

What is claimed is:

1. An ultraviolet and infrared absorptive glass comprising a coloring component,
wherein the glass is a soda-lime-silica glass,
wherein the coloring component comprises 0.05-0.9 mass % of $CeO_2$, 0.50-1.20 mass % of total iron oxide in terms of $Fe_2O_3$, 0.08-0.30 mass % of FeO, 0.1-1.5 mass % of $TiO_2$, 10-25 mass ppm of CoO, and 0.1-50 mass ppm of $Cr_2O_3$, that mass ratio ($Fe^{2+}/Fe^{3+}$) of divalent iron to trivalent iron is 0.20-0.45, based on the mass of the ultraviolet and infrared absorptive glass,
wherein the ultraviolet and infrared absorptive glass is green,
wherein ultraviolet transmittance measured in accordance with International Standard ISO 9050:1990 is less than 20%, and
wherein a dominant wavelength measured by using illuminant $D_{65}$ of JIS Z 8701 is 510-560 nm.

2. The ultraviolet and infrared absorptive green glass according to claim 1, wherein visible light transmittance measured in accordance with JIS R3211 at a thickness of 5 mm or less is at least 70%.

3. The ultraviolet and infrared absorptive green glass according to claim 1, wherein solar transmittance measured in accordance with JIS R3106 is less than 55%.

4. The ultraviolet and infrared absorptive green glass according to claim 1, wherein the soda-lime-silica glass contains 65-80 mass % $SiO_2$, 0-5 mass % $Al_2O_3$, 0-10 mass % MgO, 5-15 mass % CaO, 10-18 mass % $Na_2O$, and 0-5 mass % $K_2O$, wherein total of MgO and CaO is 5-15 mass %, and total of $Na_2O$ and $K_2O$ is 10-20 mass %.

5. A green window glass produced by subjecting the ultraviolet and infrared absorptive green glass according to claim 4 to a tempering treatment.

6. The ultraviolet and infrared absorptive green glass according to claim 1, wherein ultraviolet transmittance measured in accordance with International Standard ISO 9050:1990 is less than 18%.

7. The ultraviolet and infrared absorptive green glass according to claim 1, wherein the coloring component contains 0.3-1.5 mass % of $TiO_2$.

8. An ultraviolet and infrared absorptive glass comprising a coloring component,
wherein the glass is a soda-lime-silica glass,
wherein the coloring component consists essentially of 0.05-0.9 mass % of $CeO_2$, 0.50-1.20 mass % of total iron oxide in terms of $Fe_2O_3$, 0.08-0.30 mass % of FeO, 0.1-1.5 mass % of $TiO_2$, 10-25 mass ppm of CoO, and 0.1-50 mass ppm of $Cr_2O_3$, that mass ratio ($Fe^{2+}/Fe^{3+}$) of divalent iron to trivalent iron is 0.20-0.45, based on the mass of the ultraviolet and infrared absorptive glass,
wherein the ultraviolet and infrared absorptive glass is green,
wherein ultraviolet transmittance measured in accordance with International Standard ISO 9050:1990 is less than 20%, and
wherein a dominant wavelength measured by using illuminant $D_{65}$ of JIS Z 8701 is 510-560 nm.

9. The ultraviolet and infrared absorptive green glass according to claim 8, wherein visible light transmittance measured in accordance with JIS R3211 at a thickness of 5 mm or less is at least 70%.

10. The ultraviolet and infrared absorptive green glass according to claim 8, wherein solar transmittance measured in accordance with JIS R3106 is less than 55%.

11. The ultraviolet and infrared absorptive green glass according to claim 8, wherein the soda-lime-silica glass contains 65-80 mass % $SiO_2$, 0-5 mass % $Al_2O_3$, 0-10 mass % MgO, 5-15 mass % CaO, 10-18 mass % $Na_2O$, and 0-5 mass % $K_2O$, wherein total of MgO and CaO is 5-15 mass %, and total of $Na_2O$ and $K_2O$ is 10-20 mass %.

12. A green window glass produced by subjecting the ultraviolet and infrared absorptive green glass according to claim 11 to a tempering treatment.

13. The ultraviolet and infrared absorptive green glass according to claim 8, wherein ultraviolet transmittance measured in accordance with International Standard ISO 9050:1990 is less than 18%.

14. The ultraviolet and infrared absorptive glass according to claim 8, wherein the coloring component contains 0.3-1.5 mass % of $TiO_2$.

* * * * *